United States Patent
Dogiamis et al.

(10) Patent No.: US 10,404,499 B2
(45) Date of Patent: Sep. 3, 2019

(54) DISPERSION COMPENSATION FOR WAVEGUIDE COMMUNICATION CHANNELS

(71) Applicant: Intel Corporation, Santa Clara, CA (US)

(72) Inventors: Georgios C. Dogiamis, Chandler, AZ (US); Emanuel Cohen, Haifa (IL); Sasha N. Oster, Chandler, AZ (US); Telesphor Kamgaing, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/388,564

(22) Filed: Dec. 22, 2016

(65) Prior Publication Data

US 2018/0183522 A1 Jun. 28, 2018

(51) Int. Cl.
*H04B 10/90* (2013.01)
*H04L 25/03* (2006.01)
*H04J 1/08* (2006.01)

(52) U.S. Cl.
CPC ....... *H04L 25/03834* (2013.01); *H04B 10/90* (2013.01); *H04J 1/08* (2013.01)

(58) Field of Classification Search
None
See application file for complete search history.

(56) References Cited

U.S. PATENT DOCUMENTS

| | | | |
|---|---|---|---|
| 4,180,705 A | 12/1979 | Guidoux et al. | |
| 5,321,849 A * | 6/1994 | Lemson | H03G 3/3052 398/209 |
| 8,130,059 B2 * | 3/2012 | Wang | H01P 9/00 333/156 |
| 8,264,300 B2 * | 9/2012 | Cisco | H01P 9/00 333/161 |
| 2002/0175776 A1* | 11/2002 | Pleasant | H04B 10/25752 333/17.1 |
| 2003/0078074 A1* | 4/2003 | Sesay | H04B 10/25754 455/561 |

(Continued)

FOREIGN PATENT DOCUMENTS

EP    2903183 A1 *   8/2015   ......... H04L 25/0384

OTHER PUBLICATIONS

Grattan et al., Optical Fiber Sensor Technology: Fundamentals, 2000, Springer Science+Business Media, pp. 45-47.*

(Continued)

Primary Examiner — Kenneth N Vanderpuye
Assistant Examiner — Jai M Lee
(74) Attorney, Agent, or Firm — Schwabe, Williamson & Wyatt, P.C.

(57) ABSTRACT

Embodiments of the present disclosure may relate to a transmitter that includes a baseband dispersion compensator to perform baseband dispersion compensation on an input signal. Embodiments may also include a receiver that includes a radio frequency (RF) dispersion compensator to perform RF dispersion compensation. Embodiments may also include a dielectric waveguide coupled with the transmitter and the receiver, the dielectric waveguide to convey the RF signal from the transmitter to the receiver. Other embodiments may be described and/or claimed.

24 Claims, 8 Drawing Sheets

(56) References Cited

U.S. PATENT DOCUMENTS

| | | | |
|---|---|---|---|
| 2004/0197103 A1* | 10/2004 | Roberts | H04B 10/2543 398/159 |
| 2005/0078779 A1 | 4/2005 | Lenosky | |
| 2006/0018583 A1* | 1/2006 | Iannelli | H04B 10/58 385/4 |
| 2007/0140703 A1* | 6/2007 | Fells | H04B 10/58 398/159 |
| 2008/0153416 A1* | 6/2008 | Washiro | H04B 5/00 455/41.1 |
| 2008/0226301 A1* | 9/2008 | Alic | H04B 10/505 398/158 |
| 2009/0142069 A1* | 6/2009 | Wree | H04B 10/25133 398/147 |
| 2009/0304391 A1* | 12/2009 | Harley | H04B 10/25137 398/147 |
| 2010/0014872 A1* | 1/2010 | Fu | H04B 10/25137 398/158 |
| 2012/0027401 A1 | 2/2012 | Wood et al. | |
| 2012/0120862 A1* | 5/2012 | Mihota | H04B 7/022 370/312 |
| 2012/0230685 A1* | 9/2012 | Jung | H04B 10/112 398/43 |
| 2013/0170840 A1* | 7/2013 | Chang | H04B 10/2575 398/115 |
| 2013/0230328 A1* | 9/2013 | Fan | H04B 10/25759 398/115 |
| 2014/0050478 A1* | 2/2014 | Sun | H04B 10/2575 398/66 |
| 2016/0065312 A1* | 3/2016 | Oyama | H04B 10/2543 398/194 |
| 2016/0095055 A1 | 3/2016 | Sarrigeorgidis et al. | |
| 2016/0112134 A1* | 4/2016 | Masunaga | H04B 10/0799 398/115 |
| 2017/0126320 A1* | 5/2017 | Cho | H04B 10/2575 |

OTHER PUBLICATIONS

Weib, Mario, 60 GHz photonic millimeter-wave communication systems, 2010, pp. 15-34.*
Sharpened Productions, Baseband, 2011, https://techterms.com/definition/baseband.*
Atef et al., Optoelectronic Circuits in Nanometer CMOS Technology, Mar. 2006, Springer International Publishing, pp. 15-18.*
Kawakami et al., Characteristics of a Doubly Clad Optical Fiber with a Low-Index Inner Cladding, 1974, IEEE, pp. 879-887.*
Hsieh et al., Slow-Wave Bandpass Filters Using Ring or Stepped-Impedance Hairpin Resonators, 2001, IEEE, pp. 1795-1800.*
Wikipedia, Optical Fiber, Apr. 2016, pp. 1-12.*
International Search Report and Written Opinion dated Mar. 29, 2018 for International Application No. PCT/US2017/063119, 13 pages.

* cited by examiner

DISPERSION COMPENSATION FOR WAVEGUIDE COMMUNICATION CHANNELS

FIELD

Embodiments of the present disclosure generally relate to the field of dielectric waveguides and, more particularly, to compensation for dispersion of signals therein.

BACKGROUND

As increasing numbers of devices become interconnected, and users consume more data, the demand on servers to provide that data may continue to grow. These demands may include, for example, increased data rates, switching architectures with longer interconnects, reduced cost, and power competitive solutions.

For medium range transmission in servers and high performance computers, dielectric waveguides operating in the millimeter (mm)-wave frequency range may provide performance and cost advantage with respect to optical and/or electrical fabrics. As used herein, "medium range" may refer to transmission ranges of approximately 1 to approximately 5 meters (m). The desired data rate at a mm-wave frequency range may be achieved by taking advantage of available frequency bandwidth. For example, a radio or transceiver operating over a 40 Gigahertz (GHz) bandwidth from 100 GHz to 140 GHz may deliver data rates of approximately 40 Gigabits per second (Gbps) with a quadrature phase shift keying (QPSK) modulation scheme. The same radio may deliver up to 80 Gbps over the same frequency range if a quadrature amplitude modulation 16 (QAM16) modulation scheme is used.

In radio-over-waveguide applications, wherein radio waves are transmitted through a dielectric waveguide, a single mode waveguide operating over a broad frequency range may experience varying group delay response as a function of the frequency over medium range. This chromatic dispersion may result in inter-symbol interference, as digital signals carried on different wavelengths travel at different speeds through the same waveguide.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
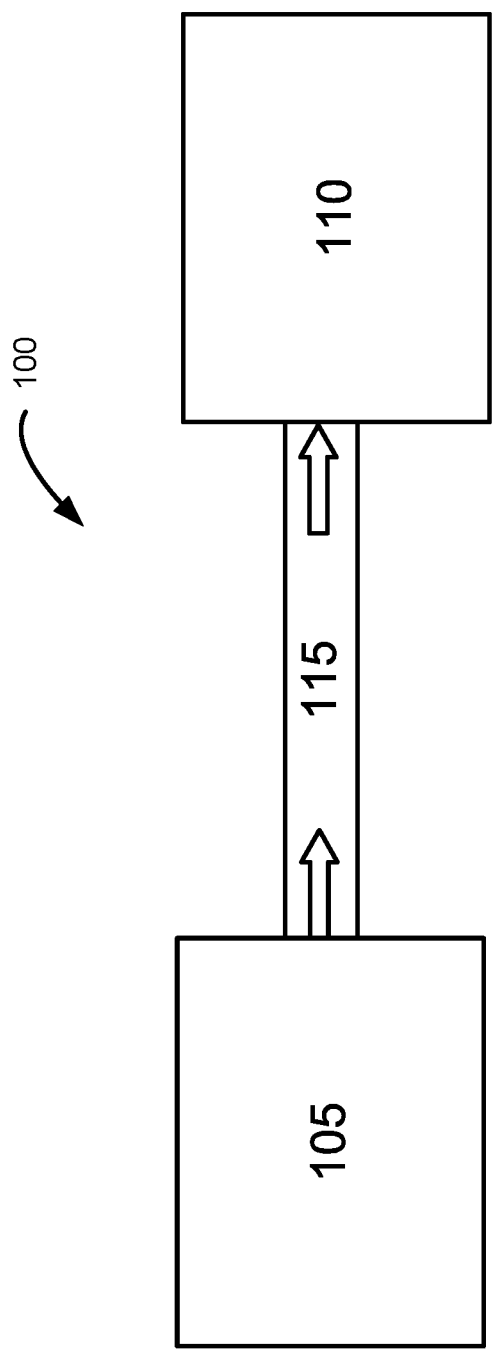
FIG. 1 depicts an example system with a dielectric waveguide, in accordance with various embodiments.

Embodiments of the present disclosure may relate to a transmitter that includes a baseband dispersion compensator to perform baseband dispersion compensation on an input signal. The compensated signal may then be transmitted from the transmitter to a receiver by way of a dielectric waveguide. The receiver may then include a radio frequency (RF) dispersion compensator and/or a baseband dispersion compensator to perform RF dispersion compensation. In this way, the system may reduce and/or eliminate the effects of chromatic dispersion.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first layer formed, deposited, or otherwise disposed on a second layer" may mean that the first layer is formed, deposited, grown, bonded, or otherwise disposed over the second layer, and at least a part of the first layer may be in direct contact (e.g., direct physical and/or electrical contact) or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 depicts an example system 100 with a dielectric waveguide 115, in accordance with various embodiments. Specifically, the system 100 may include a transmitter 105 and a receiver 110. The transmitter 105 may be configured to transmit a signal through dielectric waveguide 115. The dielectric waveguide 115 may also be known as a "waveguide channel."

More specifically, the transmitter 105 may be configured to receive a signal that is in a baseband frequency range. For example, the transmitter 105 may be coupled to a computing device capable of generating the signal and conveying it to the transmitter 105. In other embodiments, the transmitter 105 may be an element of the computing device that generates the signal. The baseband frequency range may be, for example, between approximately 1 Megahertz (MHz) and approximately 50 GHz. The transmitter 105 may then upconvert the signal from the baseband frequency range to the radio frequency (RF) frequency range. The RF frequency range may be, for example, between approximately 30 GHz and approximately 900 GHz. In some embodiments an RF frequency range between approximately 30 GHz and approximately 300 GHz may be referred to as a mm-wave frequency range. In some embodiments, the frequency range between approximately 300 GHz and approximately 900 GHz may be referred to as a sub-terahertz (THz) frequency range. In some embodiments, the RF frequency range may be, for example, between approximately 90 GHz and approximately 300 GHz.

The transmitter 105 may then transmit the RF signal to the receiver 110 through the dielectric waveguide 115. Specifically, the transmitter may modulate the signal onto a plurality of frequencies in the RF frequency range, and then transmit the resultant RF signal through the dielectric waveguide 115.

The dielectric waveguide 115 may be a solid dielectric waveguide that includes one or more dielectric layers. For example, in some embodiments the dielectric waveguide 115 may include a plurality of different dielectric layers with different refractive indices. For example, the dielectric waveguide 115 may be composed of 3 different dielectric layers. The refractive indices of the layers of the dielectric waveguide 115 may be selected such that the RF signal transmitted through the dielectric waveguide 115 may generally reflect within, and propagate through, the dielectric waveguide 115 without incurring significant signal loss. In another embodiment, a single-material dielectric waveguide with or without metal coating may be used as waveguide channel.

The RF signal may then be received at the receiver 110 and downconverted back to the baseband frequency range. The downconverted signal may then be processed by the receiver 110 and/or output to a computing device coupled with the receiver 110 and able to process the downconverted signal.

In embodiments, the example system 100 may be an element of a server. For example, the transmitter 105 may be an element of one rack of a server, and the receiver 110 may be an element of another rack of the server. In some embodiments, transmitter 105 and receiver 110 may be elements of the same rack of a server. In other embodiments, the transmitter 105 may be an element of one server, and the receiver 110 may be an element of another server. These are intended only as example configurations, and in other configurations the transmitter 105 and/or receiver 110 may be elements of some other type of server, computing device, mobile device, laptop, desktop, data center, or some other electronic device. In some embodiments, the dielectric waveguide 115 may have a length of between approximately 1 m and approximately 5 m. In some embodiments, the dielectric waveguide 115 may have a length greater than approximately 5 m, though such a length may have negative affects on aspects such as datarate and/or power consumption As described above, the transmitter 105 may modulate the baseband signal onto a plurality of frequencies in the RF frequency range, and then transmit the resultant RF signal through the dielectric waveguide 115. However, the dielectric waveguide may be susceptible to a phenomenon known as "chromatic dispersion." Chromatic dispersion may describe a phenomenon whereas signals sent at different frequencies may propagate through a medium at different speeds.

Figure 2:
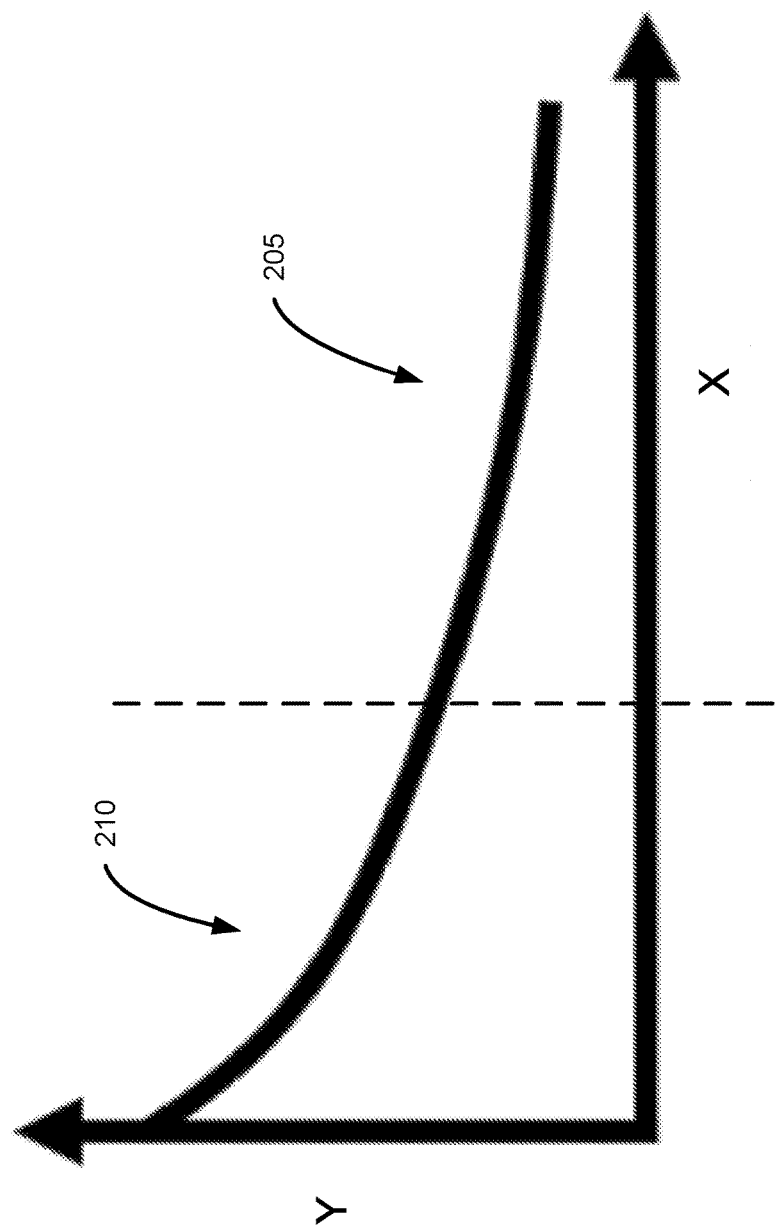
FIG. 2 depicts an example dispersion graph associated with a dielectric waveguide, in accordance with various embodiments.

FIG. 2 depicts an example of chromatic dispersion in a dielectric waveguide such as dielectric waveguide 115. Specifically, the Y axis depicts time delay, which may be measured in nanoseconds (ns). The X axis depicts increasing frequency, which may be measured in Gigahertz (GHz). As can be seen, signals at a higher frequency (for example, those in region 205) may experience less delay than signals at a lower frequency (for example, those in region 210).

The delay may become significant in dielectric waveguides such as dielectric waveguide 115 that have a length in the approximately 1 to approximately 5 m range. Specifically, the signal sent by the transmitter 105 may be relatively well defined with respect to a time axis. However, as the signal propagates through the dielectric waveguide 115, the signal may spread along the time axis because the higher frequencies may travel at a faster rate than the lower frequencies. When the signal arrives at the receiver 110, the signal may have spread significantly. This spread may make it difficult for the receiver 110 to identify where the received signal begins or ends. If multiple signals are transmitted in adjacent time slots, the signals may also start to overlap with one another such that identification of an individual signal may become difficult for the receiver 110.

However, embodiments herein may address the above-described chromatic dispersion by performing dispersion compensation in two different frequency domains. First, the transmitter 105 may perform dispersion compensation in the baseband domain. The receiver 110 may also perform dispersion compensation in the RF domain and the baseband domain. Both of these dispersion compensation techniques are described in further detail below.

Figure 3:
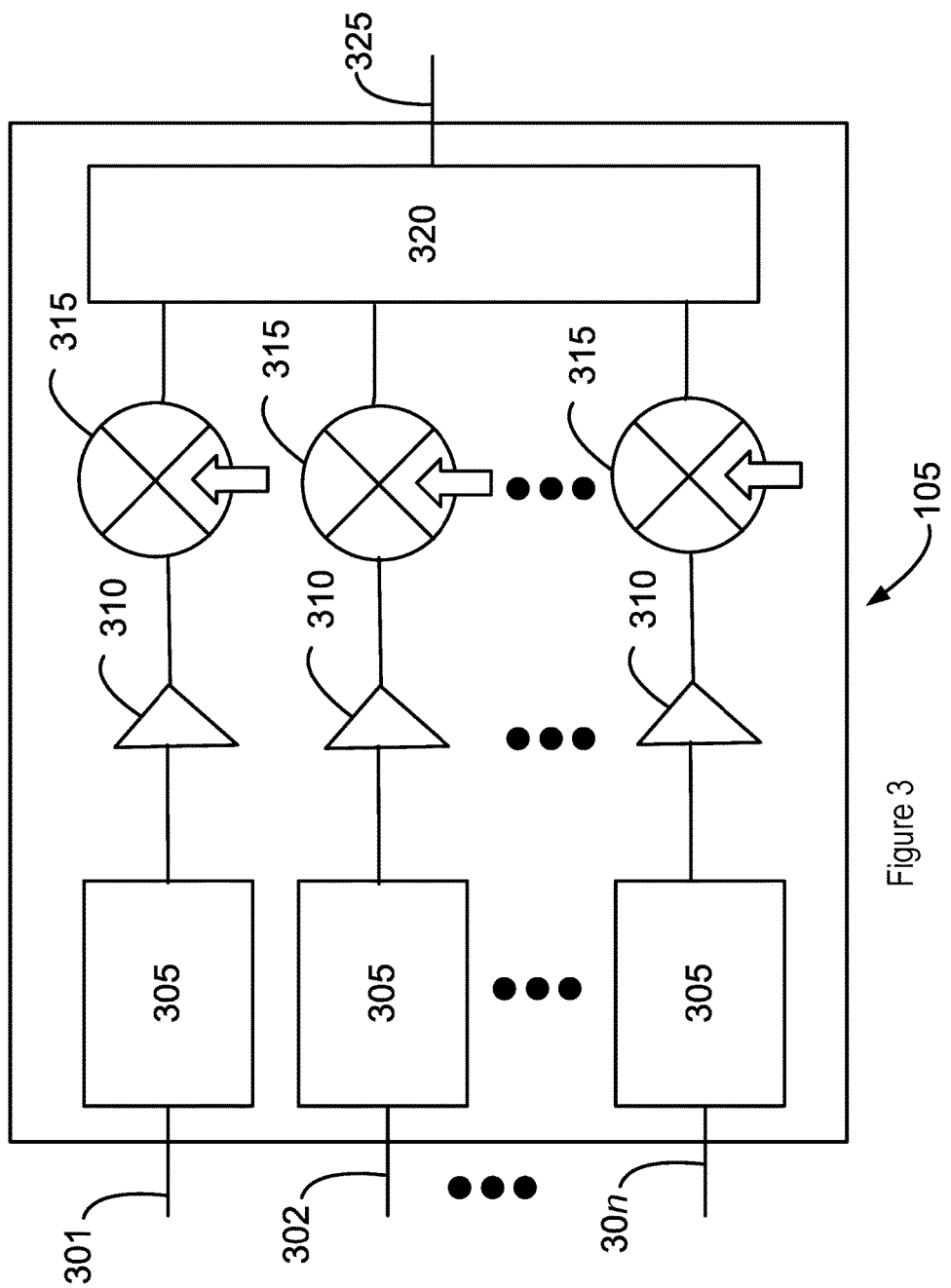
FIG. 3 depicts an example transmitter, in accordance with various embodiments.

FIG. 3 depicts a detailed example transmitter 105 that is configured to perform the baseband dispersion compensation, in accordance with various embodiments. Specifically, the transmitter 105 may include n inputs such as inputs 301, 302, 30n, etc. It will be understood that n inputs is intended only as an example. In some embodiments, the transmitter 105 may include 1 input, 2 inputs, more than 2 inputs, etc. The inputs 301/302/30n may be configured to receive one or more signals in the baseband frequency domain. As described above, the signals may be received from an electronic device to which the transmitter 105 is physically, electronically, and/or communicatively coupled. For example, the transmitter 105 may share the same housing as the electronic device, or be separate from the electronic device but communicatively coupled to the electronic device by the inputs 301/302/30n.

The data may then be input into baseband dispersion compensation circuitry 305. The baseband dispersion compensation circuitry 305 may be configured to perform baseband dispersion compensation on the baseband signal received from inputs 301/302/30n. In embodiments, the baseband dispersion compensation circuitry 305 may include active and/or passive circuitry. The baseband dispersion compensation may include, for example, pulse shaping, pre-distortion, pre-emphasis, and/or some other bandwidth dispersion compensation technique. Generally, this type of dispersion compensation may be referred to as a "fine" compensation. In other embodiments, these dispersion compensation techniques may be referred to as "bandwidth shaping" techniques.

As used herein, pulse shaping may refer to the technique of changing a waveform of the baseband signal itself. For example, the baseband signal may be flattened, rounded, or modulated to some other form.

As used herein, emphasis or pre-emphasis techniques (when placed at the transmitter side) may refer to systems designed to change the magnitude of certain frequencies of the signal spectrum with respect to the magnitude of other frequencies of the signal spectrum. Typically, higher frequencies may get amplified with respect to lower frequencies. Such techniques may help to compensate the frequency dependent channel losses (attenuation distortion), thereby increasing the overall signal to noise ratio.

As used herein, pre-distortion may refer to systems that are specifically designed to inversely model certain communication channel phase and gain characteristics. Such techniques may help to compensate non-linear channel characteristics and non-constant phase behaviors, thereby increasing the overall signal to noise ratio and producing a more linear overall channel response.

In embodiments, the baseband dispersion compensation may be selected or configured based on a characteristic of the dielectric waveguide 115. For example, the type and/or configuration of the baseband dispersion compensation may be preconfigured based on a known channel response or channel characteristic of the dielectric waveguide 115. In other embodiments, the transmitter 105 may be configured to dynamically and/or periodically test the dielectric waveguide 115 to identify a characteristic of the dielectric waveguide 115 on which to base the baseband dispersion compensation.

It will be understood that the embodiment of the baseband dispersion compensation circuitry 305 herein is intended as an example. For example, although transmitter 105 is depicted as having separate baseband dispersion compensation circuitry 305 for each of inputs 301/302/30n, in other embodiments one or more of the inputs, or all of the inputs, may share a baseband dispersion compensation circuitry 305. Additionally, although it is referred to as "circuitry," in embodiments the baseband dispersion compensation may be performed by one or more modules, logic, firmware, software, and/or hardware.

Subsequent to the baseband dispersion compensation, the compensated baseband signal may be input to one or more components such as amplifiers 310. The amplifiers 310 may increase the amplitude of the compensated baseband signal. The amplified signal may then be input to an upconverter 315. The upconverter 315 may upconvert the amplified signal from the baseband frequency range to the RF frequency range. Specifically, the upconverters 315 may be coupled with a local oscillator (LO), not shown for the sake of clarity. The LO may input one or more LO signals to the upconverters 315. For example, the LO may output a different LO signal to each upconverter 315, or may output the same LO signal to two or more of the upconverters 315. The upconverters may then perform a mathematical operation such as multiplication using the amplified signal and the LO signal to produce a compensated signal in the RF frequency range. In other embodiments the multiplication operation might be referred to as "mixing".

The various signals from the upconverters 315 may then be multiplexed together by a multiplexer 320. The multiplexer 320 may also be referred to as a "combiner." As used herein, "multiplexing" may refer to combining the signals in some way. Specifically, multiplexer 320 may be a frequency division multiplexer (FDM) that combines one or more data signals or transmission by assigning different data signals to one or more different frequencies. Multiple data signals may be sent simultaneously over a given frequency range. For example, the data received on input 301 may be assigned to a first group of one or more frequency bands in the RF frequency range, while data received on input 302 may be assigned to a second group of one or more frequency bands in the RF frequency range. In some embodiments, the multiplexer may use time division multiplexing (TDM), code division multiplexing (CDM), orthogonal FDM (OFDM), and/or some other type of multiplexing. The multiplexed RF signal may then be transmitted through an output 325 which may be coupled with dielectric waveguide 115, for example through an on-die or an on-package waveguide launcher.

Although the transmitter 105 is depicted as shown in FIG. 3, it will be understood that the transmitter 105 is intended as an example and other configurations may be possible. For example, additional components such as filters, processors, etc. may be present in transmitter 105. In some embodiments, there may be more or fewer amplifiers 310 than shown in FIG. 3. For example, in some embodiments a single amplifier may be shared among multiple signal lines, or a single signal line may be coupled with a plurality of amplifiers. In some embodiments a signal line may not include an amplifier. As used herein, a "signal line" may refer to the above-described transmission path of data received on an input such as input 301, 302, 30n, etc. Similarly, there may be more or fewer upconverters than shown in FIG. 3. In some embodiments, the arrangement of the elements may be different than shown, for example, one or more upconverters 315 may precede an amplifier 310 in a signal line, the multiplexer 320 may precede one or more of the baseband dispersion compensation circuitry 305, the amplifier 310, and/or the upconverter 315, etc. In embodiments, one or more of the described upconversion, amplification, multiplexing, etc. may be performed by one or more circuitry, modules, logic, firmware, software, and/or hardware.

Figure 4:
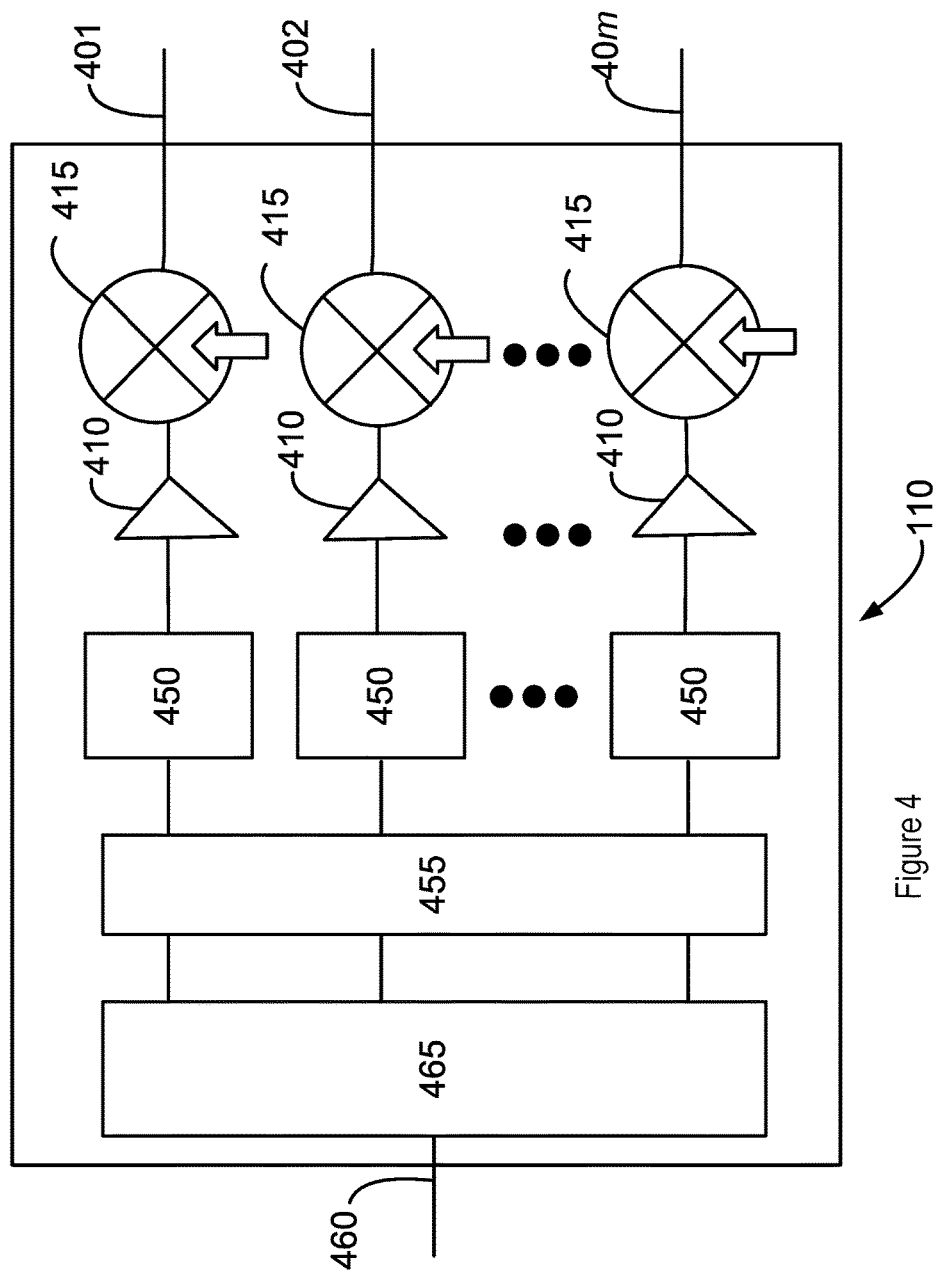
FIG. 4 depicts an example receiver, in accordance with various embodiments.

FIG. 4 depicts a detailed example receiver 110 that is configured to perform the RF dispersion compensation, in accordance with various embodiments. Specifically, the receiver 110 may include an input 460 coupled with the dielectric waveguide 115. The input 460 may receive, from the dielectric waveguide 115, the multiplexed RF signal transmitted from output 325.

The receiver 110 may include a demultiplexer 465 coupled with the input 460. In some embodiments, the demultiplexer 465 may also be referred to as a "splitter." The demultiplexer 465 may be configured to process and split the multiplexed RF signal into the different m RF signals. In other words, the demultiplexer 465 may undo the multiplexing performed by the multiplexer 320 to create m different signal lines. In embodiments, the number m of signal lines generated by the demultiplexer 465 may be the same as the number n of signal lines propagating through the transmitter 105. In other embodiments, the number m of signal lines generated by the demultiplexer 465 may be different than the number n of signal lines propagating through the transmitter 105. Similarly to the use of the term with respect to the transmitter 105, the term "signal line" may refer to the transmission path of data through the receiver 110. More specifically, receiver 110 is shown as having m different signal lines.

The demultiplexed RF signals may then be input into RF dispersion compensation circuitry 455. The RF dispersion compensation circuitry 455 may be configured to perform "coarse" dispersion compensation on the demultiplexed RF signals. For example, the RF dispersion compensation circuitry 455 may perform analog filtering and/or slow-wave structures on the demultiplexed RF signals.

For example, the RF dispersion compensation circuitry 455 may perform some sort of analog filtering by removing or reducing signals having a frequency in a specific portion of the RF frequency range. This filtering may be, for example, passband filtering, high frequency filtering, low frequency filtering, etc. For example, in some embodiments the RF dispersion compensation circuitry 455 may include an all-pass filter with a specifically designed phase response. In this all-pass filter, specific frequencies may not be reduced or removed, but the phase response of the filter may be different between different frequencies. This different phase response may result in reduction or elimination of the dispersion of the dielectric waveguide 115 via the "negative" phase response of the filter.

Additionally or alternatively, the RF dispersion compensation circuitry 455 may include a slow-wave structure. Generally, a slow-wave structure may serve to reduce the group delay of a given signal by reducing the velocity of the signal itself. As the initial faster portions of the signal encounter the slow-wave structure, those portions are slowed. This allows the slower portions of the signal to "catch up," thereby reducing the overall group delay of the signal. In some embodiments, the slow-wave structure may be a passive physical structure that may utilize metamaterials such as electromagnetic band gap structures, corrugated dielectric surfaces, right hand transmission lines (e.g. delay lines), left hand transmission lines and/or combination thereof. It will be understood that these examples of RF dispersion compensation are intended only as examples, and in other embodiments the RF dispersion compensation circuitry 455 may be capable of performing some other type of "coarse" dispersion compensation at the RF frequency range. It will also be understood that in some embodiments, the RF dispersion compensation circuitry 455 may be located at a different location than that shown. For example, in some embodiments the RF dispersion compensation circuitry may be located in the signal path prior to the demultiplexer 465. In this embodiment, the RF dispersion compensation circuitry 455 may perform a more wideband dispersion compensation technique that may cover the entire RF frequency range.

The RF dispersion compensation circuitry 455 may then output one or more RF dispersion compensated signals to one or more filters 450. The filters 450 may be configured to filter excess noise from the RF dispersion compensated signals to produce filtered RF signals that are input to one or more amplifiers 410. In embodiments, the amplifiers 410 may be similar to amplifiers 310 described earlier. Specifically, the amplifiers 410 may be configured to increase or otherwise alter the overall amplitude of the filtered RF signals to produce amplified RF signals.

The amplified RF signals may then be fed into one or more downconverters 415. The downconverters 415 may be configured to downconvert the amplified RF signals from the RF frequency range to the baseband frequency range. Specifically, the downconverters 415 may be coupled with a LO configured to produce one or more LO signals. As described above with respect to upconverters 315, the LO may output a different LO signal to each of the downconverters 415, or may output the same LO signal to two or more of the downconverters 415. The downconverters 415 may then perform a mathematical operation to reverse the mathematical operation performed by upconverters 315. For example, if upconverters 315 relied on an multiplicative operation on the LO signal and the data signal, the downconverters 415 may perform another multiplicative operation to reverse operation by the upconverters 315. The downconverters 415 may then recover the baseband signals received on inputs 301, 302, 30n, and output the recovered baseband signals on outputs 401, 402, 40m.

Although the receiver 110 is depicted as shown in FIG. 4, it will be understood that the receiver 110 is intended as an example and other configurations may be possible. For example, additional components such as additional filters, processors, additional amplifiers, etc. may be present in receiver 110. In some embodiments, there may be more or fewer amplifiers 410, filters 450, and/or downconverters 415 than shown in FIG. 4. For example, in some embodiments a single amplifier 410, a single filter 450, and/or a single downconverter 415 may be shared among multiple signal lines, or a single signal line may be coupled with a plurality of amplifiers/filters/downconverters or some other component. In some embodiments, a signal line may not include an amplifier 410 or a filter 450. In some embodiments, the arrangement of the elements may be different than shown, for example, one or more downconverters 415 may precede an amplifier 410 in a signal line, etc. In embodiments, one or more of the described filtering, RF dispersion compensation, downconversion, amplification, multiplexing, etc. may be performed by one or more circuitry, modules, logic, firmware, software, and/or hardware.

Figure 5:
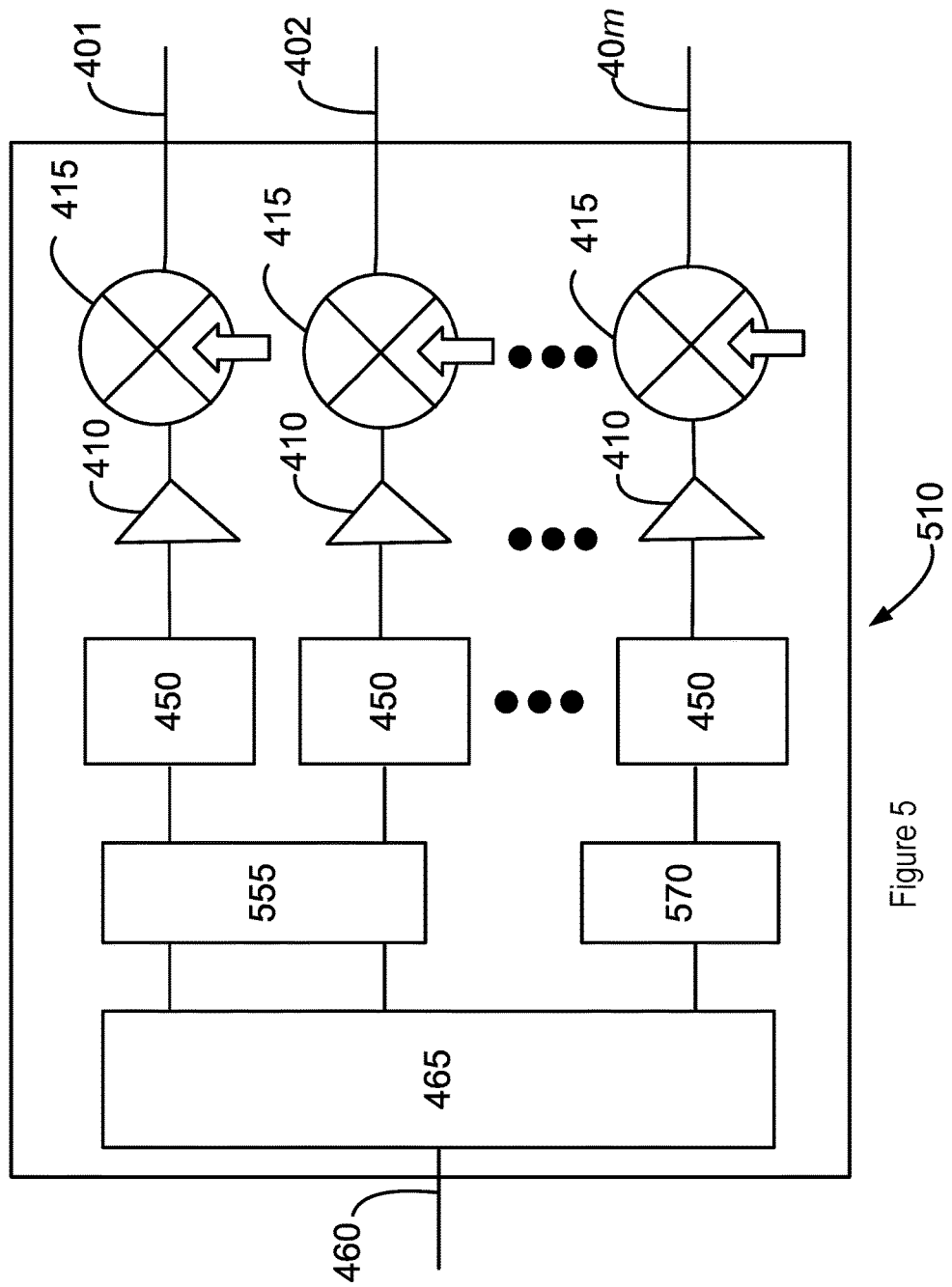
FIG. 5 depicts an alternative example receiver, in accordance with various embodiments.

In some embodiments, different RF dispersion compensation may be performed on different subsets of the demultiplexed RF signals. For example, the demultiplexer 465 may output signals at different frequency ranges. As discussed above with respect to FIG. 2, signals in different frequency ranges, for example, the lower frequency signals in region 210, may experience different group delay than the higher frequency signals in region 205. In this case, it may be desirable to perform different RF dispersion compensation on signals in region 210 than those signals in region 205. FIG. 5 depicts an alternative receiver 510 that has two RF dispersion compensation circuits 555 and 570. The receiver 510 may include other numbered elements similar to those of FIG. 4 that are not re-described here.

In embodiments, the RF dispersion compensation circuits 555 and 570 may be similar to RF dispersion compensation circuitry 455. However, the RF dispersion compensation circuits 555 and 570 may perform different RF dispersion compensation than one another. For example, the demultiplexed RF signals received by RF dispersion compensation circuit 555 may include RF signals in the RF frequency region 210, while the demultiplexed RF signals received by RF dispersion compensation circuit 570 may correspond to RF signals in the RF frequency region 205. As such, it may be desirable to perform different RF dispersion compensation on the two different RF frequency ranges given the different group delay they may experience. As an example, it may be desirable for RF dispersion compensation circuit 570 to use a slow-wave structure on the relatively faster signals in region 205, while RF dispersion compensation circuit 555 may perform analog filtering on the relatively delayed RF signals in region 210.

Figure 6:
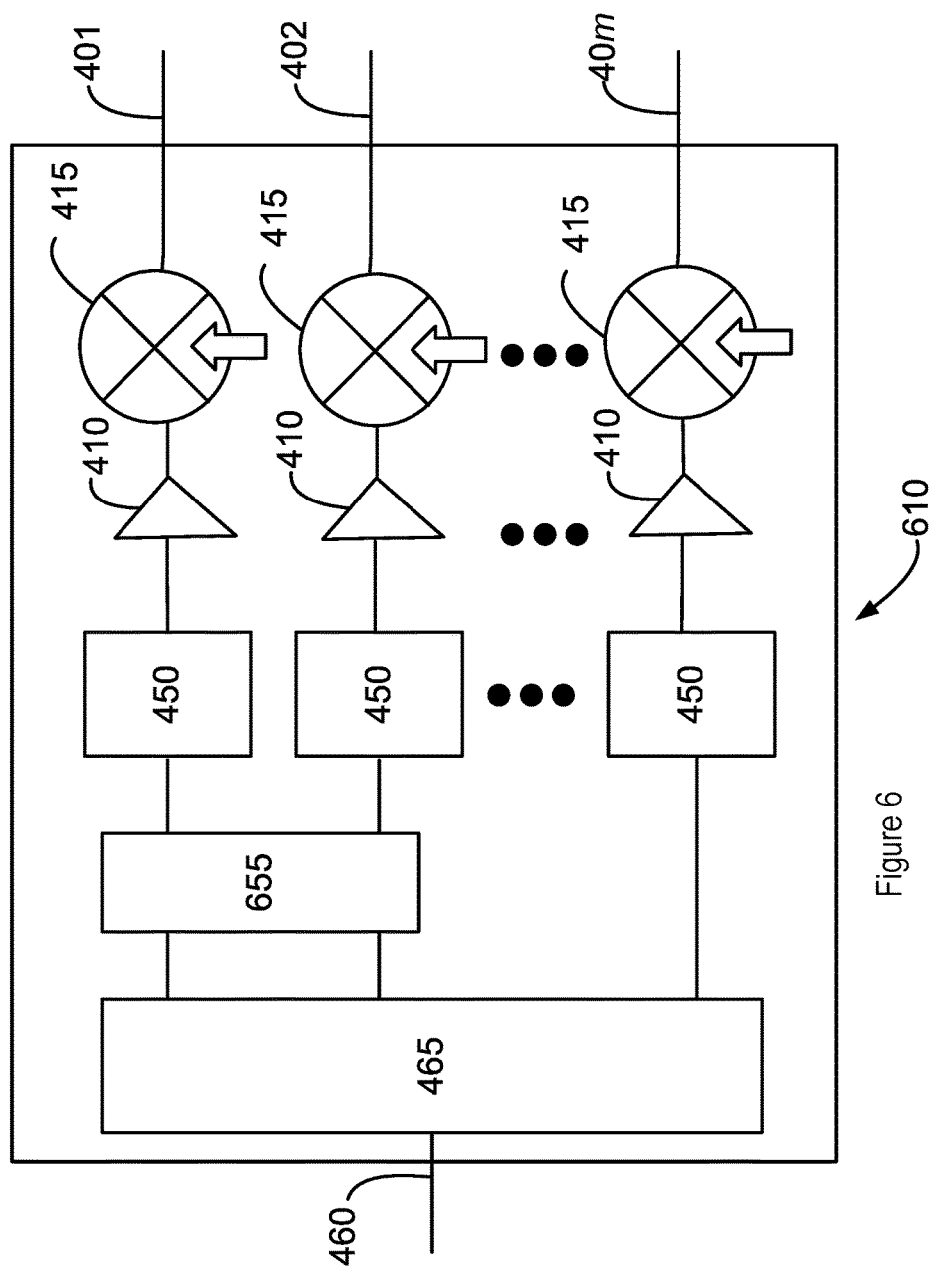
FIG. 6 depicts an alternative example receiver, in accordance with various embodiments.

In some embodiments, it may be desirable for some demultiplexed RF signals to not experience any RF dispersion compensation, for example, as shown by receiver 610 in FIG. 6. The receiver 610 may include numbered elements similar to those of FIGS. 4 and 5 that are not re-described here.

The receiver 610 may include RF dispersion compensation circuitry 655, which may be similar to RF dispersion compensation circuitry 455. However, as can be seen in FIG. 6, the signal line associated with output 40m may not experience any RF dispersion compensation circuitry. Rather the demultiplexed RF signal may be output from the demultiplexer 465 to the filter 450. This may be desirable if, for example, the RF dispersion compensation circuitry 655 is a slow-wave structure that is to operate only on RF signals in the relatively faster region 205.

Figure 8:
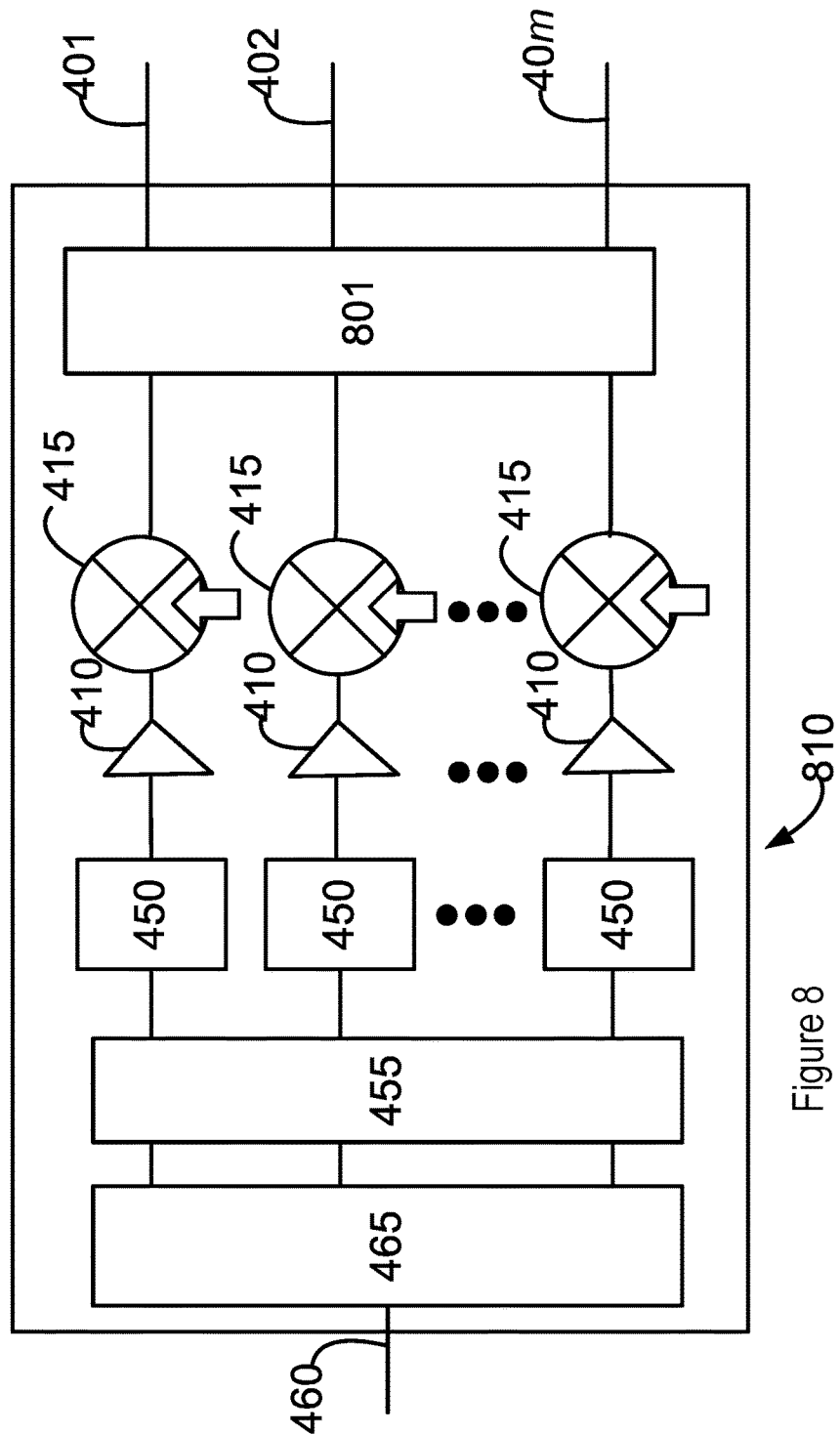
FIG. 8 depicts an alternative example receiver, in accordance with various embodiments.

In some embodiments, the receiver may additionally include baseband dispersion compensation circuitry. Specifically, FIG. 8 depicts an example receiver 810 that has elements similar to those of receiver 110, and are not re-described herein for the sake of redundancy. As shown in FIG. 8, receiver 810 may include baseband dispersion compensation circuitry 801.

As shown, baseband dispersion compensation circuitry 801 may be located in the signal path subsequent to downconverters 415 and may be configured to perform some form of equalization or some other type of active or passive baseband dispersion compensation. As used herein, qualization may refer to increasing or decreasing the amplitude of certain frequencies or frequency bands of the baseband signal. The equalization may be performed, for example, by a direct feedback equalizer (DFE) or some other type of equalizer. Similarly to baseband dispersion compensation circuitry 305, in embodiments the baseband dispersion compensation performed by baseband dispersion compensation circuitry 801 may be dependent on one or more characteristics of the waveguide 115. For example, if the signal received by receive 810 from the waveguide 115 has a known amount of loss or a known channel response, then the baseband dispersion compensation circuitry 801 may perform some type of equalization or other compensation to counter that waveguide characteristic.

It will be understood that although the baseband dispersion compensation circuitry 801 is shown as coupled with each of downconverters 415 in signal paths 1 through m, in some embodiments one or more of the signal paths may not be coupled with baseband dispersion compensation circuitry 801. In some embodiments, one or more of the signal paths may be coupled with baseband dispersion compensation circuitry that is different than the baseband dispersion compensation circuitry of another of the signal paths.

It will be understood that the receivers 110, 510, 610, and 810 are examples, and in other embodiments the RF dispersion compensation circuitry may be arranged differently. For example, in some embodiments RF dispersion compensation may be performed only on a single signal line. In some embodiments, there may be two or more different RF dispersion compensation circuitries, each coupled with the same or different signal lines, and another signal line may have no RF dispersion compensation. In some embodiments, the RF dispersion compensation may be part of a general receiver package, and may not be limited to the same chip as, for example, the demultiplexer 465 or other components of receivers 110, 510, 610, or 810.

The above described system 100, transmitter 105, and/or receivers 110, 510, 610, or 810 may present advantages to systems that use dielectric waveguides 115 in the 1 m to 5 m range to convey signals in the mm-wave range and/or sub-THz range. For example, the above-described architecture may help to achieve higher data rates than systems that mainly rely on equalization to compensate for chromatic dispersion. Additionally, the use of the dielectric waveguide in the mm-wave frequency range may present a cost advantage to other common optical interconnects. Dispersion compensation may also enable reduction of the number of channels needed for the system, which may potentially result in size reduction of the system.

Figure 7:
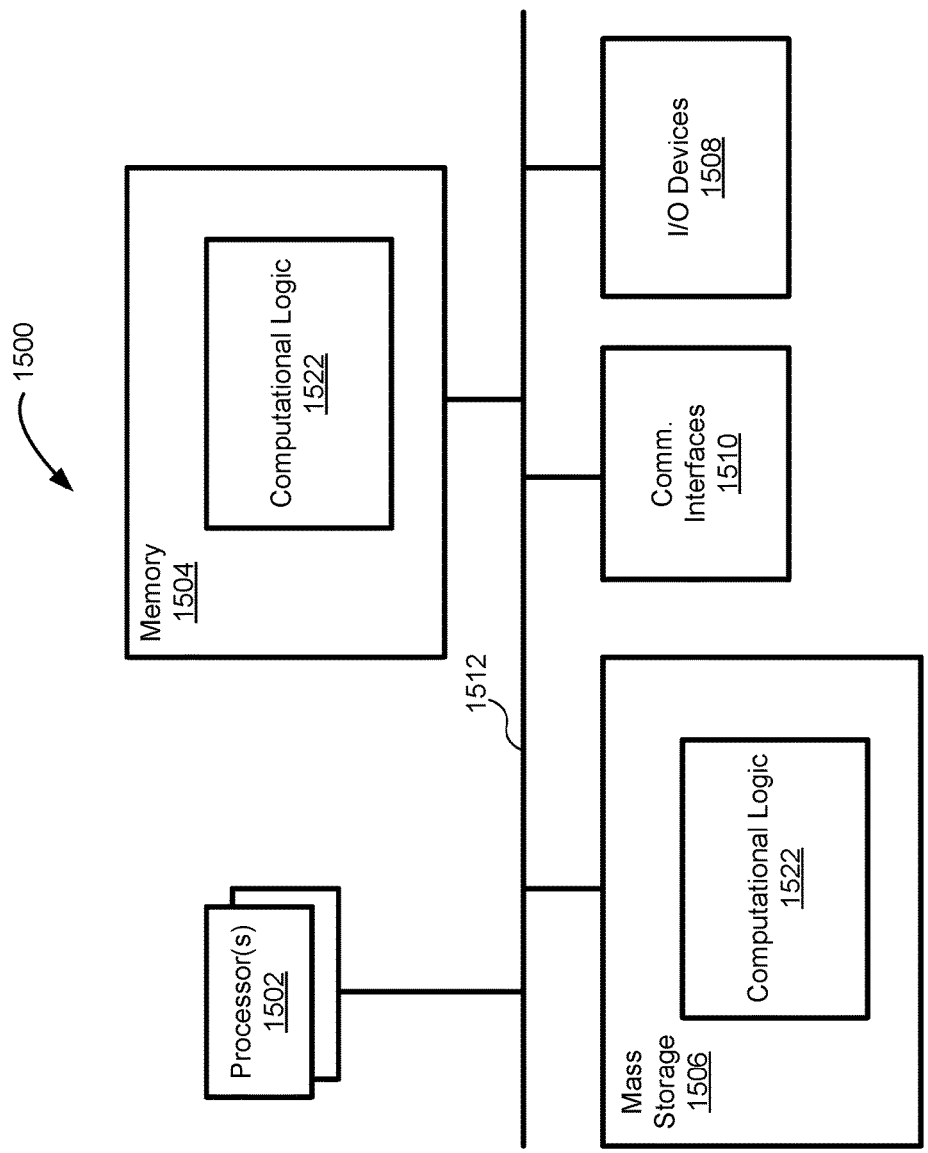
FIG. 7 depicts an example computing device, in accordance with various embodiments.

FIG. 7 illustrates an example computing device 1500 suitable for use with various components of FIG. 1. For example, the computing device 1500 may be, or may include or otherwise be coupled to, transmitter 105 and/or receivers 110, 510, 610, or 810. As shown, computing device 1500 may include one or more processors or processor cores 1502 and system memory 1504. For the purpose of this application, including the claims, the terms "processor" and "processor cores" may be considered synonymous, unless the context clearly requires otherwise. The processor 1502 may include any type of processors, such as a central processing unit (CPU), a microprocessor, and the like. The processor 1502 may be implemented as an integrated circuit having multi-cores, e.g., a multi-core microprocessor. The computing device 1500 may include mass storage devices 1506 (such as diskette, hard drive, volatile memory (e.g., dynamic random-access memory (DRAM), compact disc read-only memory (CD-ROM), digital versatile disk (DVD), and so forth). In general, system memory 1504 and/or mass storage devices 1506 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 1500 may further include I/O devices 1508 (such as a display (e.g., a touchscreen display), keyboard, cursor control, remote control, gaming controller, image capture device, and so forth) and communication interfaces 1510 (such as network interface cards, modems, infrared receivers, radio receivers (e.g., Bluetooth), and so forth).

The communication interfaces 1510 may include communication chips (not shown) that may be configured to operate the device 1500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1510 may operate in accordance with other wireless protocols in other embodiments. In some embodiments, the communication interfaces 1510 may be, may include, and/or may be coupled with inputs 301/302/30n and/or outputs 401/402/40m.

The above-described computing device 1500 elements may be coupled to each other via system bus 1512, which may represent one or more buses. In the case of multiple buses, they may be bridged by one or more bus bridges (not shown). Each of these elements may perform its conventional functions known in the art. In particular, system memory 1504 and mass storage devices 1506 may be employed to store a working copy and a permanent copy of the programming instructions for the operation of various components of computing device 1500, including but not limited to an operating system of computing device 1500 and/or one or more applications. The various elements may be implemented by assembler instructions supported by processor(s) 1502 or high-level languages that may be compiled into such instructions.

The permanent copy of the programming instructions may be placed into mass storage devices 1506 in the factory, or in the field through, for example, a distribution medium (not shown), such as a compact disc (CD), or through communication interface 1510 (from a distribution server (not shown)). That is, one or more distribution media having an implementation of the agent program may be employed to distribute the agent and to program various computing devices.

The number, capability, and/or capacity of the elements 1508, 1510, 1512 may vary, depending on whether computing device 1500 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1504 may include computational logic 1522 configured to implement various firmware and/or software services associated with operations of the computing device 1500. For some embodiments, at least one of processors 1502 may be packaged together with computational logic 1522 configured to practice aspects of embodiments described herein to form a System in Package (SiP) or a System on Chip (SoC).

In various implementations, the computing device 1500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1500 may be any other electronic device that processes data.

EXAMPLES

Example 1 may include an apparatus comprising: a transmitter that includes: a baseband dispersion compensator to perform baseband dispersion compensation on an input signal at a baseband frequency domain to generate a compensated baseband signal; and an upconverter to upconvert the compensated baseband signal from the baseband frequency domain to a radio frequency (RF) signal in an RF frequency domain; a receiver that includes: an RF dispersion compensator to perform RF dispersion compensation on the RF signal to generate an RF dispersion compensated signal; and a downconverter to downconvert the RF dispersion compensated signal from the RF frequency domain to the baseband frequency domain to generate a recovered baseband signal; and a dielectric waveguide coupled with the transmitter and the receiver, the dielectric waveguide to convey the RF signal from the transmitter to the receiver.

Example 2 may include the apparatus of example 1, wherein the RF frequency domain is between approximately 30 gigahertz (GHz) and approximately 900 GHz.

Example 3 may include the apparatus of example 2, wherein the RF frequency domain is between approximately 90 GHz and approximately 300 GHz.

Example 4 may include the apparatus of example 1, wherein the dielectric waveguide includes a solid dielectric material.

Example 5 may include the apparatus of example 1, wherein the baseband frequency domain is between approximately 1 megahertz (MHz) and approximately 50 gigahertz (50 GHz).

Example 6 may include the apparatus of any of examples 1-5, wherein the receiver further includes a demultiplexer to demultiplex the RF signal into a first RF signal at a first frequency range and a second RF signal at a second frequency range.

Example 7 may include the apparatus of example 6, wherein the RF dispersion compensator is to perform dispersion compensation on the first RF signal, and not perform dispersion compensation on the second RF signal.

Example 8 may include the apparatus of example 7, wherein the RF dispersion compensator is a first RF dispersion compensator, and wherein the receiver includes a second RF dispersion compensator to perform dispersion compensation on the second RF signal.

Example 9 may include the apparatus of any of examples 1-5, wherein the baseband dispersion compensation or the RF dispersion compensation are based on a channel characteristic of the dielectric waveguide or a channel response of the dielectric waveguide.

Example 10 may include the apparatus of any of examples 1-5, wherein the baseband dispersion compensation includes pulse shaping or pre-distortion.

Example 11 may include the apparatus of any of examples 1-5, wherein the RF dispersion compensation includes analog filtering or a slow-wave structure.

Example 12 may include the apparatus of any of examples 1-5, wherein the baseband dispersion compensator is a first baseband dispersion compensator, and wherein receiver further includes a second baseband dispersion compensator to perform baseband dispersion compensation on the recovered baseband signal.

Example 13 may include the apparatus of example 12, wherein the second baseband dispersion compensator is to perform equalization on the recovered baseband signal.

Example 14 may include a transmitter to transmit a radio frequency (RF) signal in an RF frequency domain that is between approximately 30 gigahertz (GHz) and approximately 300 GHz to a receiver via a dielectric waveguide, the transmitter comprising: a baseband dispersion compensator to perform baseband dispersion compensation on an input signal at a baseband frequency domain to generate a compensated baseband signal; and an upconverter to upconvert the compensated baseband signal from the baseband frequency domain to the RF frequency domain to generate the RF signal.

Example 15 may include the transmitter of example 14, wherein the dielectric waveguide includes a solid dielectric material.

Example 16 may include the transmitter of example 14, wherein the baseband frequency domain is between approximately 1 megahertz (MHz) and approximately 50 gigahertz (GHz).

Example 17 may include the transmitter of any of examples 14-16, wherein the baseband dispersion compensation is based on a channel characteristic of the dielectric waveguide or a channel response of the dielectric waveguide.

Example 18 may include the transmitter of any of examples 14-16, wherein the baseband dispersion compensation includes pulse shaping or pre-distortion.

Example 19 may include a receiver to receive, from a dielectric waveguide, a radio frequency (RF) signal in an RF frequency domain between approximately 30 gigahertz (GHz) and approximately 300 GHz, wherein the receiver comprises: an RF dispersion compensator to perform RF dispersion compensation on the RF signal to generate an RF dispersion compensated signal; and a downconverter to downconvert the RF dispersion compensated signal from the RF frequency domain to a baseband frequency domain to generate a recovered baseband signal.

Example 20 may include the receiver of example 19, wherein the dielectric waveguide includes a solid dielectric material.

Example 21 may include the receiver of example 19, wherein the baseband frequency domain is between approximately 1 megahertz (MHz) and approximately 50 gigahertz (GHz).

Example 22 may include the receiver of any of examples 19-21, wherein the receiver further includes a demultiplexer to demultiplex the RF signal into a first RF signal at a first frequency range and a second RF signal at a second frequency range.

Example 23 may include the receiver of example 22, wherein the RF dispersion compensator is to perform dispersion compensation on the first RF signal, and not perform dispersion compensation on the second RF signal.

Example24 may include the receiver of example 23, where the RF dispersion compensator is a first RF dispersion compensator and further comprising a second RF dispersion compensator to perform dispersion compensation on the second RF signal.

Example 25 may include the receiver of any of examples 19-21, wherein the receiver further comprises a baseband dispersion compensator to perform baseband compensation on the recovered baseband signal.

Example 26 may include the receiver of example 25, wherein the baseband dispersion compensator is to perform equalization on the recovered baseband signal.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

We claim:

1. An apparatus comprising:
   a transmitter that includes:
      a first baseband dispersion compensator to perform baseband dispersion compensation on a first input signal at a baseband frequency domain to generate a first compensated baseband signal, wherein to perform baseband dispersion compensation on the first input signal includes to apply pre-distortion to compensate non-linear channel characteristics of a dielectric waveguide for the first input signal;
      a second baseband dispersion compensator to perform baseband dispersion compensation on a second input signal at a baseband frequency domain to generate a second compensated baseband signal, wherein to perform baseband dispersion compensation on the second input signal includes to apply pre-distortion to compensate non-linear channel characteristics of the dielectric waveguide for the second input signal, to separate the non-linear channel characteristics of the dielectric waveguide for the second input signal from the non-linear channel characteristics of the dielectric waveguide for the first input signal; and
      an upconverter to upconvert the first compensated baseband signal from the baseband frequency domain to a first radio frequency (RF) signal in a first RF range of an RF frequency domain, and to upconvert the second compensated baseband signal to a second RF signal in a second RF range of the RF frequency domain, wherein the first RF range is higher than the second RF range, and the first RF signal has less delay in the dielectric waveguide than the second RF signal;
   a receiver that includes:
      a first RF dispersion compensator to perform RF dispersion compensation on the first RF signal to generate a first RF dispersion compensated signal, wherein the first RF dispersion compensator includes a slow-wave structure to reduce velocity of the first RF signal;
      a second RF dispersion compensator to perform RF dispersion compensation on the second RF signal to generate a second RF dispersion compensated signal, wherein velocity of the second RF signal is free from being reduced by a slow-wave structure; and
      a downconverter to downconvert the first and the second RF dispersion compensated signals from the RF frequency domain to the baseband frequency domain to generate first and second recovered baseband signals, respectively; and the dielectric waveguide coupled with the transmitter and the receiver to convey the first and the second RF signals from the transmitter to the receiver.

2. The apparatus of claim 1, wherein the RF frequency domain is between approximately 30 gigahertz (GHz) and approximately 900 GHz.

3. The apparatus of claim 2, wherein the RF frequency domain is between approximately 90 GHz and approximately 300 GHz.

4. The apparatus of claim 1, wherein the dielectric waveguide includes a solid dielectric material.

5. The apparatus of claim 1, wherein the baseband frequency domain is between approximately 1 megahertz (MHz) and approximately 50 gigahertz (50 GHz).

6. The apparatus of claim 1, wherein the receiver further includes a demultiplexer to demultiplex a RF signal received from the transmitter into the first RF signal at the first RF range and the second RF signal at the second RF range.

7. The apparatus of claim 6, wherein the first RF dispersion compensator is to perform dispersion compensation on the first RF signal, and the second RF dispersion compensator does not perform dispersion compensation on the second RF signal.

8. The apparatus of claim 1, wherein the baseband dispersion compensation or the RF dispersion compensation are further based on a channel response of the dielectric waveguide.

9. The apparatus of claim 1, wherein the baseband dispersion compensation includes pulse shaping or pre-distortion.

10. The apparatus of claim 1, wherein the RF dispersion compensation includes analog filtering.

11. The apparatus of claim 1, wherein the receiver further includes a third baseband dispersion compensator to perform baseband dispersion compensation on the first and second recovered baseband signals.

12. The apparatus of claim 11, wherein the third baseband dispersion compensator is to perform equalization on the first and second recovered baseband signals.

13. A transmitter to transmit radio frequency (RF) signals in an RF frequency domain that is between approximately 30 gigahertz (GHz) and approximately 300 GHz to a receiver via a dielectric waveguide, the transmitter comprising:

a first baseband dispersion compensator to perform baseband dispersion compensation on a first input signal at a baseband frequency domain to generate a first compensated baseband signal, wherein to perform baseband dispersion compensation on the first input signal includes to apply pre-distortion to compensate non-linear channel characteristics of the dielectric waveguide for the first input signal;

a second baseband dispersion compensator to perform baseband dispersion compensation on a second input signal at a baseband frequency domain to generate a second compensated baseband signal, wherein to perform baseband dispersion compensation on the second input signal includes to apply pre-distortion to compensate non-linear channel characteristics of the dielectric waveguide for the second input signal, to separate the non-linear channel characteristics of the dielectric waveguide for the second input signal from the non-linear channel characteristics of the dielectric waveguide for the first input signal; and an upconverter to upconvert the first compensated baseband signal from the baseband frequency domain to a first RF signal in a first RF range of the RF frequency domain between approximately 30 gigahertz (GHz) and approximately 300 GHz to be transmitted via the dielectric waveguide; and to upconvert the second compensated baseband signal to a second RF signal in a second RF range of the RF frequency domain between approximately 30 gigahertz (GHz) and approximately 300 GHz, wherein the first RF range is higher than the second RF range, and the first RF signal has less delay in the dielectric waveguide than the second RF signal.

14. The transmitter of claim 13, wherein the dielectric waveguide includes a solid dielectric material.

15. The transmitter of claim 13, wherein the baseband frequency domain is between approximately 1 megahertz (MHz) and approximately 50 gigahertz (GHz).

16. The transmitter of claim 13, wherein the baseband dispersion compensation is further based on a channel response of the dielectric waveguide.

17. The transmitter of claim 13, wherein the baseband dispersion compensation includes pulse shaping or pre-distortion.

18. A receiver to receive, from a dielectric waveguide, radio frequency (RF) signals in an RF frequency domain between approximately 30 gigahertz (GHz) and approximately 300 GHz, wherein the receiver comprises:

a first RF dispersion compensator to perform RF dispersion compensation on a first RF signal received from the dielectric waveguide to generate a first RF dispersion compensated signal, wherein the first RF dispersion compensator includes a slow-wave structure to reduce velocity of the first RF signal;

a second RF dispersion compensator to perform RF dispersion compensation on a second RF signal received from the dielectric waveguide to generate a second RF dispersion compensated signal, wherein the first RF signal has less delay in the dielectric waveguide than the second RF signal, and velocity of the second RF signal is free from being reduced by a slow-wave structure; and a downconverter to downconvert the first and the second RF dispersion compensated signals from the RF frequency domain to a baseband frequency domain to generate a first and a second recovered baseband signals, respectively.

19. The receiver of claim 18, wherein the dielectric waveguide includes a solid dielectric material.

20. The receiver of claim 18, wherein the baseband frequency domain is between approximately 1 megahertz (MHz) and approximately 50 gigahertz (GHz).

21. The receiver of claim 18, wherein the receiver further includes a demultiplexer to demultiplex an RF signal into the first RF signal at a first frequency range and the second RF signal at a second frequency range.

22. The receiver of claim 21, wherein the first RF dispersion compensator is to perform dispersion compensation on the first RF signal, and the second RF dispersion compensator is not to perform dispersion compensation on the second RF signal.

23. The receiver of claim 18, wherein the receiver further comprises a baseband dispersion compensator to perform baseband compensation on the first and second recovered baseband signals.

24. The receiver of claim 23, wherein the baseband dispersion compensator is to perform equalization on the first and second recovered baseband signals.

\* \* \* \* \*